US009626686B2

United States Patent
Hirano et al.

(10) Patent No.: US 9,626,686 B2
(45) Date of Patent: Apr. 18, 2017

(54) SELECTING SPORTING EVENTS BASED ON EVENT STATUS

(71) Applicant: YAHOO! INC., Sunnyvale, CA (US)

(72) Inventors: Kelly William Hirano, Cupertino, CA (US); Michael Todd Kitzman, Redondo Beach, CA (US); Mark Norwood Delamere, Los Angeles, CA (US); Edward Joseph Campbell, III, San Jose, CA (US); Brian Thomas Marshall, Redondo Beach, CA (US); Hans Chiao-Hsi Yang, Hawthorne, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 15/161,721

(22) Filed: May 23, 2016

(65) Prior Publication Data
US 2016/0267502 A1 Sep. 15, 2016

Related U.S. Application Data

(63) Continuation of application No. 12/555,959, filed on Sep. 9, 2009, now Pat. No. 9,348,913.

(51) Int. Cl.
*G06F 17/30* (2006.01)
*G06Q 30/02* (2012.01)
*G06Q 10/10* (2012.01)
*H04L 29/08* (2006.01)

(52) U.S. Cl.
CPC ... *G06Q 30/0201* (2013.01); *G06F 17/30864* (2013.01); *G06Q 10/10* (2013.01); *G06Q 30/02* (2013.01); *H04L 67/02* (2013.01)

(58) Field of Classification Search
CPC ........ G06F 17/30864; G06F 17/30867; G06F 17/30067; G06F 17/30283; G06F 17/30663; H04L 67/02; G06Q 30/02; G06Q 10/10
USPC ................................ 707/705, 748, 749, 750
See application file for complete search history.

(56) References Cited

U.S. PATENT DOCUMENTS

| 5,771,378 A * | 6/1998 | Holt ...................... G06F 17/274 707/749 |
| 6,169,992 B1 * | 1/2001 | Beall .................. G06F 17/30607 707/802 |
| 6,327,590 B1 * | 12/2001 | Chidlovskii ...... G06F 17/30867 707/734 |
| 6,441,846 B1 * | 8/2002 | Carlbom ............ A63B 24/0021 348/157 |
| 6,446,065 B1 * | 9/2002 | Nishioka ............. G06F 17/3061 707/723 |

(Continued)

*Primary Examiner* — Shahid Alam
(74) *Attorney, Agent, or Firm* — James J. DeCarlo; Greenberg Traurig, LLP

(57) ABSTRACT

Accessing one or more sets of sporting event data, each of which being associated with a particular one of one or more sporting events, and each of which comprising one or more sporting event data that indicate at least current event status of the associated sporting event at a current time. For each of the sporting events, calculating a value by applying the set of sporting event data associated with the sporting event to one or more algorithms, each of which having been determined for a particular sport to which the sporting event is categorized, comparing the value to a threshold requirement, and if the value satisfies the threshold requirement, then displaying the sporting event data associated with the sporting event.

20 Claims, 4 Drawing Sheets

(56) References Cited

U.S. PATENT DOCUMENTS

| | | | | |
|---|---|---|---|---|
| 6,701,311 | B2* | 3/2004 | Biebesheimer | G06F 17/30864 707/723 |
| 2002/0166123 | A1* | 11/2002 | Schrader | G11B 27/105 725/58 |
| 2004/0148631 | A1* | 7/2004 | Zubowicz | H04N 5/44543 725/53 |
| 2005/0001837 | A1* | 1/2005 | Shannon | G06F 3/0481 345/440 |
| 2007/0067211 | A1* | 3/2007 | Kaplan | G06Q 10/04 705/7.31 |
| 2007/0157595 | A1* | 7/2007 | Lockwood, Jr. | F02C 1/04 60/39.17 |
| 2008/0064490 | A1* | 3/2008 | Ellis | H04N 5/44543 463/25 |

\* cited by examiner

FIGURE 1

SELECTING SPORTING EVENTS BASED ON EVENT STATUS

CROSS REFERENCE TO RELATED APPLICATIONS

This application claims the benefit of and is a continuation of U.S. patent application Ser. No. 12/555,959, filed on Sep. 9, 2009, titled "Selecting Sporting Events Based on Event Status", which is incorporated by reference herein in its entirety.

TECHNICAL FIELD

The present disclosure generally relates to selecting sporting events to display in web pages based on event status.

BACKGROUND

There are a wide variety of sporting events occurring at any given time all over the world. There are many sports websites, such as Yahoo! Sports (http://sports.yahoo.com), ESPN (http://espn.go.com), FOX Sports (http://msn.foxsports.com), and Sports Illustrated (http://sportsillustrated.cnn.com), that provide general or specific information about various sporting events that have occurred, are currently occurring, or will occur.

People, e.g., sports enthusiasts, can access information concerning the various sporting events through such sports websites. However, due to the potentially large number of sporting events that may all be occurring at the same time around the world, the sports enthusiasts may miss something interesting, exciting, important, or extraordinary that has occurred or is currently occurring in particular sporting events. For example, if a baseball game is occurring at the same time as a basketball game and a tennis match, the sports enthusiasts may need to figure out not only that these sporting events are occurring at the same time, but also to look up the status of each sporting event to decide which of these sporting events may be more interesting to them. In addition, while a person is following one sporting event, something may occur in another sporting event that the person may wish to know immediately. However, because the person is focusing his/her attention on one sporting event, he/she may not learn about things occurring in other sporting events until much later. Even worse, he/she may completely miss some of the things occurring in other sporting events.

There are continuous efforts to improve the quality of the sporting event data that is presented in the web pages. Real time, high priority, and interesting sporting event data is one of the areas where the various websites compete to present the most recent, most accurate, and most popular sporting event data.

SUMMARY

The present disclosure generally relates to displaying sporting event data in web pages.

In particular embodiments, one or more sets of sporting event data may be accessed, each of which being associated with a particular one of one or more sporting events, and each of which comprising one or more sporting event data that indicate at least current event status of the associated sporting event at a current time. For each of the sporting events, a value may be calculated by applying the set of sporting event data associated with the sporting event to one or more algorithms, each of which having been determined for a particular sport to which the sporting event is categorized. The calculated value may be compared to a threshold requirement. If the value satisfies the threshold requirement, then the sporting event data associated with the sporting event may be displayed.

These and other features, aspects, and advantages of the disclosure are described in more detail below in the detailed description and in conjunction with the following figures.

BRIEF DESCRIPTION OF THE DRAWINGS

FIG. 1 illustrates an example Yahoo!® Sports front page.

DETAILED DESCRIPTION

Figure 2:
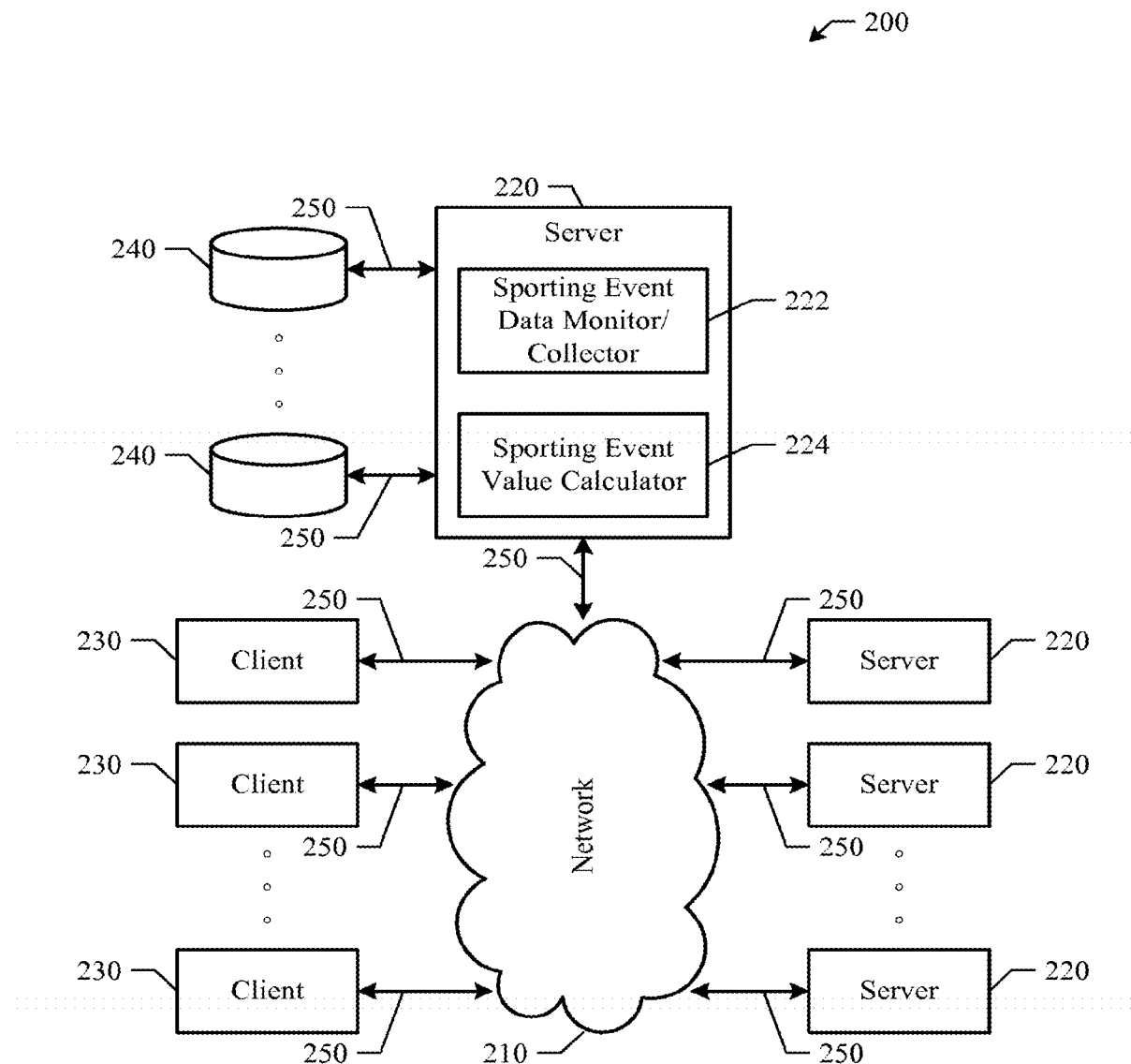
FIG. 2 illustrates an example network environment.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

There are a wide variety of sporting events occurring at any given time all over the world. There are many sports websites, such as Yahoo! Sports (http://sports.yahoo.com), ESPN (http://espn.go.com), FOX Sports (http://msn.foxsports.com), and Sports Illustrated (http://sportsillustrated.cnn.com), that provide general or specific information about various sporting events that have occurred, are currently occurring, or will occur.

People, e.g., sports enthusiasts, may access information about the various sporting events through such sports websites. However, due to the potentially large number of sporting events that may be simultaneously occurring around the world at any given time, the sports enthusiast may miss something interesting, exciting, important, or extraordinary occurring in particular sporting events.

To provide information concerning sporting events that may be especially interesting or news worthy for one reason or another, particular embodiments may calculate a value for each of a set of sporting events. Particular embodiments may select the set of sporting events with reference to a time period such that all of the sporting events in the set occur within the time period. For example and without limitation, the time period may be an hour, a few hours, a day, a few days, or a week.

In particular embodiments, for each of the sporting events in the set, the value may be calculated based at least on the current status of the sporting event. In particular embodiments, the current status of a sporting event may include, for example and without limitation, current event status concerning the sporting event, current season status concerning the sporting event, current network traffic associated with the sporting event, and current user responses to the sporting event. In addition, in particular embodiments, the value of a sporting event may be calculated further based on the past status or the predicted future status of the sporting event. In particular embodiments, for each of the sporting events in the set, the value may be calculated using one or more algorithms determined for the particular sport to which the sporting event belongs.

In particular embodiments, the values of the sporting events are compared to a predetermined threshold. One or more sporting events each having a value that satisfies the predetermined threshold requirement may be selected. In particular embodiments, the sporting event data of the selected sporting events may be displayed in one or more web pages.

Figure 1:
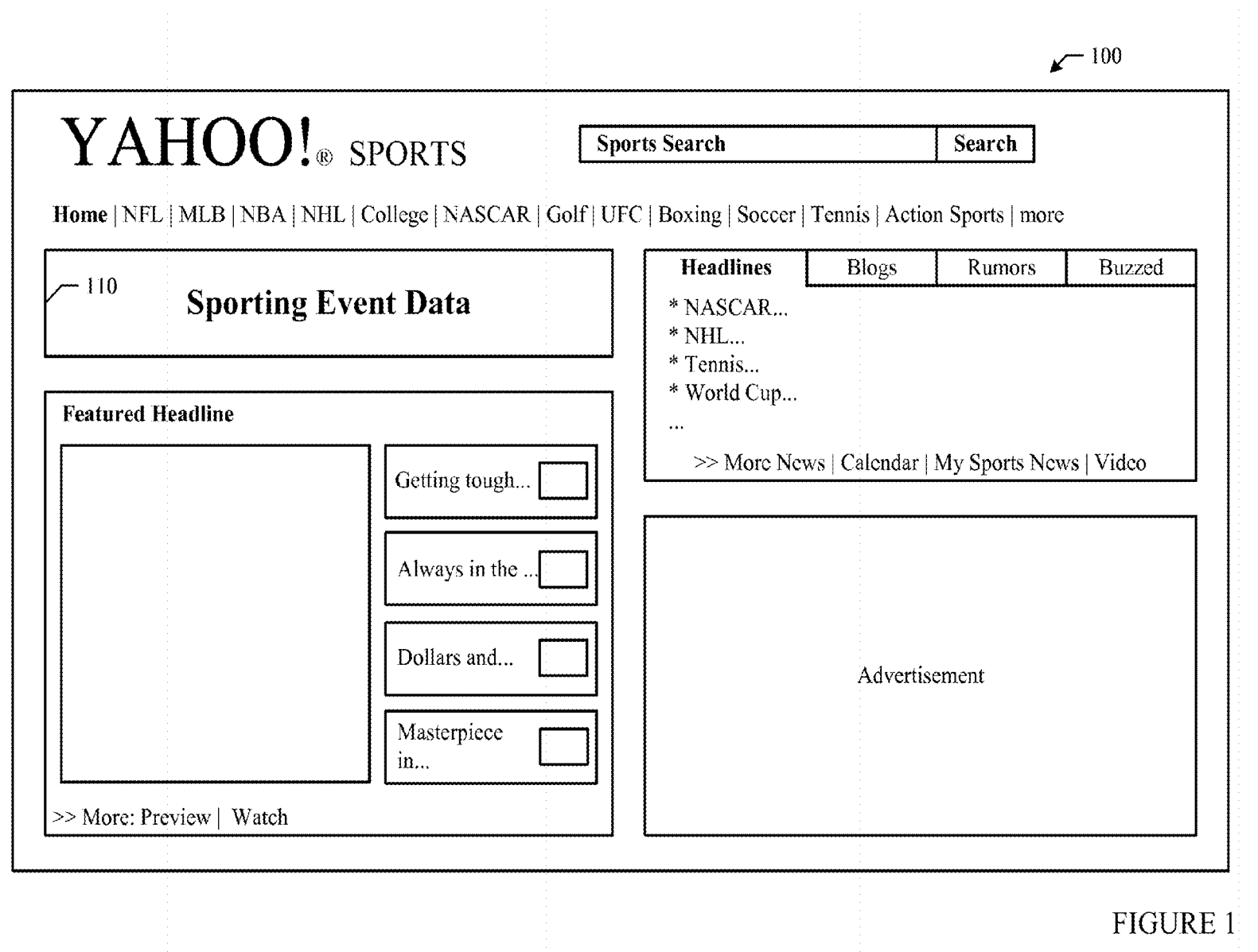

FIG. 1 illustrates a simplified Yahoo!® Sports Front Page 100. Web page 100 is partitioned into several areas or components. In particular embodiments, one or more components in web page 100, e.g., component 110, may be used to display the sporting event data of one or more sporting events. In particular embodiments, component 110 may be used to display the sporting event data of one or more sporting events having calculated values that satisfy the predetermined threshold requirement. In particular embodiments, the sporting event data of a single sporting event having a calculated value that satisfies the predetermined threshold requirement may be displayed in component 110. In this case, if multiple sporting events have calculated values satisfying the predetermined threshold requirement, then the sporting event data of the sporting event that has the highest calculated value may be displayed in component 110. Note that it is possible that no sporting event in the set may have a calculated value that satisfies the predetermined threshold requirement, in which case no sporting event data may be displayed in component 110.

Particular embodiments may be implemented in a network environment. FIG. 2 illustrates an example network environment 200. Network environment 200 includes a network 210 coupling one or more servers 220 and one or more clients 230 to each other. In particular embodiments, network 210 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 210 or a combination of two or more such networks 210. The present disclosure contemplates any suitable network 210.

One or more links 250 couple servers 220 or clients 230 to network 210. In particular embodiments, one or more links 250 each includes one or more wired, wireless, or optical links 250. In particular embodiments, one or more links 250 each includes an intranet, an extranet, a VPN, a LAN, a WLAN, a WAN, a MAN, a communications network, a satellite network, a portion of the Internet, or another link 250 or a combination of two or more such links 250. The present disclosure contemplates any suitable links 250 coupling servers 220 and clients 230 to network 210.

In particular embodiments, each server 220 may be a unitary server or may be a distributed server spanning multiple computers or multiple datacenters. Servers 220 may be of various types, such as, for example and without limitation, web server, news server, mail server, message server, advertising server, file server, application server, exchange server, database server, or proxy server. In particular embodiments, each server 220 may include hardware, software, or embedded logic components or a combination of two or more such components for carrying out the appropriate functionalities implemented or supported by server 220. For example, a web server is generally capable of hosting websites containing web pages or particular elements of web pages. More specifically, a web server may host HTML files or other file types, or may dynamically create or constitute files upon a request, and communicate them to clients 230 in response to HTTP or other requests from clients 230. A mail server is generally capable of providing electronic mail services to various clients 230. A database server is generally capable of providing an interface for managing data stored in one or more data stores.

In particular embodiments, a client 230 may be an electronic device including hardware, software, or embedded logic components or a combination of two or more such components and capable of carrying out the appropriate functionalities implemented or supported by client 230. For example and without limitation, a client 230 may be a desktop computer system, a notebook computer system, a netbook computer system, a handheld electronic device, or a mobile telephone. A client 230 may enable an Internet user at client 230 to access network 210. A client 230 may have a web browser, such as Microsoft Internet Explorer or Mozilla Firefox, and may have one or more add-ons, plug-ins, or other extensions, such as Google Toolbar or Yahoo Toolbar. A client 230 may enable its user to communicate with other users at other clients 230. The present disclosure contemplates any suitable clients 230.

In particular embodiments, one or more data storages 240 may be communicatively linked to one or more severs 220 via one or more links 250. In particular embodiments, data storages 240 may be used to store various types of information. In particular embodiments, the information stored in data storages 240 may be organized according to specific data structures. Particular embodiments may provide interfaces that enable servers 220 or clients 230 to manage, e.g., retrieve, modify, add, or delete, the information stored in data storage 240. In particular embodiments, data storage 240 may have suitable types of database software, such as, for example and without limitation, ORACLE DATABASE, SYBASE SQL SERVER, or MICROSOFT SQL SERVER, which are capable of managing the data stored in data storage 240 and enabling servers 220 or clients 230 to access the stored data. The present disclosure contemplates any suitable data storage 440. In particular embodiments, the sporting event data, which may include the past, current, and predicted future sporting event data, and the calculated values of the sporting events may be stored in one or more data storages 240.

In particular embodiments, a server 220 may include a sporting event data monitor/collector 222 and a sporting event value calculator 224. A sporting event data monitor/collector 222 or a sporting event value calculator 224 may include hardware, software, or embedded logic components for carrying out the appropriate implemented or supported functionalities of the sporting event data monitor/collector 222 or the sporting event value calculator 224. For example and without limitation, sporting event data monitor/collector 222 may collect sporting event status associated with particular sporting events. In addition, sporting even data monitor/collector 222 may collect season status, network traffic information, or user responses with respect to particular sporting events as well. Sporting event value calculator 224 may implement one or more algorithms, each algorithm determined for a particular sport. The value of a particular sporting event may be calculated using one or more algorithms determined for the particular sport to which the sporting event belongs.

Figure 3:
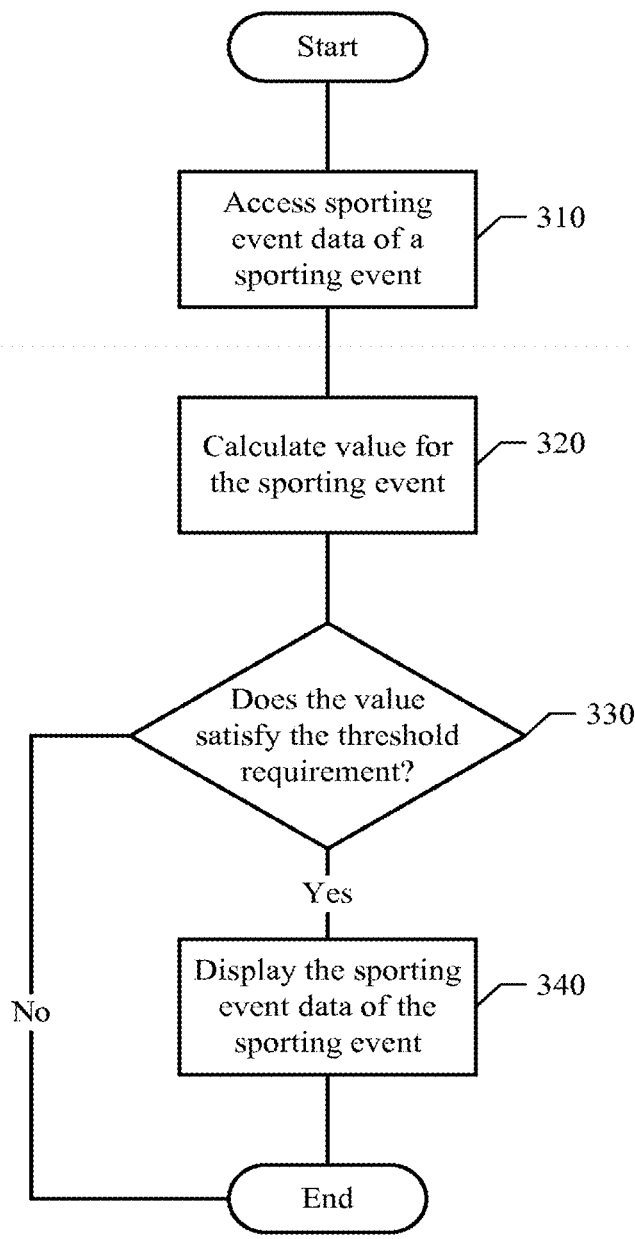
FIG. 3 illustrates an example method of selecting sporting events based on sporting event data.

FIG. 3 illustrates an example method of selecting sporting events based on sporting event data. In particular embodiments, the sporting event data of the selected sporting events may be displayed in one or more web pages, e.g., web page 100 as illustrated in FIG. 1. The steps illustrated in FIG. 3 may be applied to any number of sporting events that have occurred, are currently occurring, or will occur. Sporting events may be any game, match, or competition among one or more sports where individuals or teams are competing against each other. Examples of sporting events may include, but are not limited to, a baseball game, a basketball game, a hockey game, a soccer game, a tennis match, a bicycle race, a poker game, or a round of golf. Particular embodiments may calculate the values of one or more sporting events belonging to one or more sports. In particular embodiments, the sporting events may all occur within a time period, such as a single day. To simplify the discussion, the steps illustrated in FIG. 3 are described with respect to a single sporting event. The same process may be used to calculate the values of multiple sporting events, each of which having a set of sporting event data.

Particular embodiments may access the sporting event data of a sporting event, as illustrated in step 310. In particular embodiments, the sporting event data of a sporting event may include the current event status of the associated sporting event at a current time. The current event status of the sporting event may be sport specific or event specific and may include specific information concerning the particular sporting event in question. For example, but not by way of limitation, for a baseball game, the current event status of the associated sporting event, i.e., the baseball game, at a current time may be described as "the 70th regular season baseball game between the San Francisco Giants and the Chicago Cubs is in the 9th inning and the score is 3 to 3." As another example, but not by way of limitation, for a tennis match, the current event status of the associated sporting event, i.e., the tennis match, at a current time may be described as "a semi-final match of Wimbledon between Roger Federer and Tommy Haas is in the third set where Roger Federer has won both of the previous two sets and has won 4 games of the current set while Tommy Haas has won 2 games making the score 4-2."

In particular embodiments, the sporting event data of the sporting event may further include the current season status of the associated sporting event. The current season status of the sporting event may be sport specific, event specific, or season specific and may include specific information concerning the particular season to which the sporting event in question belongs. For example, but not by way of limitation, for a baseball game, the current season status of the associated sporting event, i.e., the baseball game, at a current time may be described as "the San Francisco Giants are ranked 2nd in Major League Baseball with a record of 49 wins and 39 losses and a win percentage of 56% whereas the Chicago Cubs are ranked 3rd with a record of 44 wins and 43 losses and a win percentage of 51%." For a basketball game, the current season status of the associated sporting event, i.e., the basketball game, may be described as "the Golden State Warriors are ranked 15th in the National Basketball Association with a record of 29 wins and 43 losses and a win percentage of 40% and the Los Angeles Clippers are ranked 20th with a record of 19 wins and 53 losses and a win percentage of 26%." Note that not all sporting events may have season status because not all types of sports may be organized based on seasons. For example, tennis matches may not have season status.

Particular embodiments may store the sporting event data of the sporting events in one or more data storages, e.g., data storage 240 as illustrated in FIG. 2. The sporting event data may be represented using a table. For example, the following table contains the sporting event data of several sporting events.

| event ID | away name | win % | away rank | away score | home name | win % | home rank | home score | inning |
|---|---|---|---|---|---|---|---|---|---|
| 280425130 | Chicago Cubs | 51 | 3 | 3 | San Francisco | 56 | 2 | 3 | 9 |
| 280425108 | Arizona | 71 | 1 | 1 | San Diego | 41 | 7 | 0 | 3 |
| 280425106 | Florida | 47 | 5 | 0 | Milwaukee | 42 | 6 | 0 | 7 |
| 280425125 | Colorado | 30 | 10 | 0 | Texas | 48 | 4 | 0 | 1 |

In particular embodiments, the sporting event data may further include current network traffic to the associated sporting event. In particular embodiments, the current network traffic to the associated sporting event may be based on a comparison between the number of pages views for the particular sporting event to the typical amount of network traffic received for a sporting event at the current time by accessing server logs for the past seven days.

For example, in the Major League baseball game between the Chicago Cubs and the San Francisco Giants, the number of page views may have increased because the score is tied and the game is nearing completion. When the page views for the Cubs-Giants game are compared to the mean and standard deviations of network traffic for Major League baseball games occurring at this time over some period of time in the past, if the page views are greater than the mean or some number of standard deviations above the mean, then the current network traffic may be increased for this sporting event. More specifically, suppose the current score is 3 to 3 and it is near the end of the game (e.g., $9^{th}$ inning), and the current network traffic generated by users viewing the game will likely have increased. This sampled network traffic may be compared to pre-calculated algorithmic means and standard deviations of network traffic for the same period of time for the same sport type (e.g., Major League baseball games) over the past seven days. An example may be that between 9:30 pm and 9:40 pm, the game in question has generated 500 page views. Over the past seven days, Major League baseball games have averaged 300 page views during the same 10-minute time span with a standard deviation of 100. The Cubs-Giants game is 2 standard deviations over the mean, which would positively impact the importance of the game.

In particular embodiments, the sporting event data may further include current user responses to the associated sporting event. In particular embodiments, current user responses may indicate a number of times that users have indicated the importance or popularity of the associated sporting event. For example, current user responses may indicate the average rating that the users have given the sporting event, such as in a 5-star rating system, the number of times that the users have voted for the sporting event, or the number of times that the users have commented on the sporting event.

In particular embodiments, the sporting event data may further include past status or predicted future status of the associated sporting event. For a sporting event that has already occurred, the sporting event data may indicate past status of the sporting event, which may include past event status, past season status, past network traffic, or past user response with respect to the past sporting event. The past status may indicate that a past sporting event was very important or popular. In particular embodiments, the past status of a sporting event may be limited by time to some amount of time in the past, such as one day, one week, or one season, or may include all past information concerning the past sporting event. For a sporting event that has not occurred, i.e., will occur some time in the future, the sporting event data may indicate predicted future status of the sporting event, which may include predicted future event status, predicted future season status, predicted future network traffic, or predicted future user response with respect to the future sporting event. The predicted future status of a future sporting event may indicate that the future sporting event may be very important or popular. In particular embodiments, the predicted future status may be limited by time to some amount of time in the future, such as one day, one week, or one season, or may include all predicted future information concerning the future sporting event. In particular embodiments, the individual pieces of sporting even data, which may include past status, current status, or predicted future status of the sporting event, may each influence the value calculated for the sporting event.

In particular embodiments, various pieces of past sporting event data or predicted future sporting event data may decrease in their influence on the calculated value as the time corresponding to the specific pieces of sporting event data is farther away from the current time. For example, a past status obtained two days ago may have less influence on the calculated value of the sporting event than a past status obtained one day ago, which in turn may have less influence on the calculated value of the sporting event than a past status obtained one hour ago. The influence that a past status has on the calculated value of the sporting event may decrease linearly or exponentially over time, or may be based on a predefined time threshold or a half-life. Similarly, a predicted future status predicted for two days from the current time may less influence on the calculated value of the sporting event than a predicted future status predicted for one day from the current time, which in turn may have less influence on the calculated value of the sporting event than a predicted future status predicted for one hour from the current time. The influence that a predicted future status has on the calculated value of the sporting event may decrease linearly or exponentially over time, or may be based on a predefined time threshold or a half-life. For example, the value of a user vote or a user rating that was cast two hours ago may be worth 10 points in terms of its influence on the calculated value; a user vote or a user rating that was cast one hour ago may be worth 20 points in terms of its influence on the calculated value; and a user vote or a user rating that was cast 0.25 hours ago may be worth 30 points in terms of its influence on the calculated value Particular embodiments calculate a value for the sporting event based on the sporting event data of the sporting event, as illustrated in step 320, by applying the sporting event data of the sporting event to one or more algorithms. As described above, the sporting event data of the sporting event may include past status, current status, or predicted future status of the sporting event. In particular embodiments, the algorithms may be predetermined. In particular embodiment, each algorithm may correspond to a particular sport. Examples of sports that may have corresponding algorithms include, but are not limited to, baseball, basketball, hockey, soccer, tennis, cycling, poker, and golf. In particular embodiments, the algorithms used to calculate the value of the sporting event are determined for the particular sport to which the sporting event belongs. That is, the algorithms are sport specific. For example, the value of a baseball game may be calculated using one or more algorithms determined for baseball; the value of a basketball game may be calculated using one or more algorithms determined for basketball; and the value of a tennis match may be calculated using one or more algorithms determined for tennis.

In particular embodiments, the value may calculated using the following equation:

$$Value = (Algorithm*0.6) + (NetworkTraffic*0.2) + (UserResponses*0.2) + Editorial,$$

where Algorithm is a sport-specific algorithm, NetworkTraffic is calculated based on a comparison between the number of pages views for the particular sporting event and the typical amount of network traffic received for any single sporting event at the current time, UserResponses indicates a number of user responses with regard to the particular sporting event, and Editorial indicates an editor's opinion of the particular sporting event. Note that it is not necessary to use all of the terms in the above equation to calculate the value of the sporting event. Sometimes, when one or more of NetworkTraffic, UserResponses, or Editorial are unavailable for a sporting event, such as for a sporting event that has not yet occurred, the value may be calculated using Algorithm alone.

As indicated above, the algorithms used to calculate the value of a sporting event are sports specific. For example, in case of a baseball game, a value may be calculated for the baseball game in step 320 using an Algorithm determined for baseball described by the following equation:

$$Algorithm = Matchup + ScorePoints + NEOG + SeasonStatus,$$

where Matchup corresponds to the quality of the opposing teams playing in the baseball game, Score Value and Near End of Game (NEOG) correspond to the current event status of the baseball game, and Season Status indicates the current season status of the baseball game.

In a particular embodiment, Matchup may be calculated using the following equation:

$$Matchup = \left( \frac{(TeamsInLeague*2) - HomeTeamRank - VisitingTeamRank + 3}{TeamsInLeague*2} \right) * MatchupWeight$$

where HomeTeamRank and VisitingTeamRank are the numerical rank of the opposing baseball teams amongst all of the rest of the teams in the baseball league based on standings rules for the league, TeamsInLeague are the total number of teams in the league, and the MatchupWeight is set to give the matchup more or less weight in the overall algorithm. For example, the San Francisco Giants are playing in a regular season baseball game against the Chicago Cubs where the San Francisco Giants are ranked 15th out of 30 Major League baseball teams whereas the Chicago Cubs are ranked 10th. If, for example, the MatchupWeight is set to 112, then the Matchup for the Giants-Cubs game may be calculated at 70.9.

In particular embodiments, Score Points may be calculated using the following equation:

$$ScorePoints = ScoreWeight - \left(\left(\frac{ScoreWeight}{5}\right) * ScoreDifference\right),$$

where ScoreWeight is set to give the score points more or less weight in the overall algorithm and the ScoreDifference is the absolute value of the home team score minus the visiting team score. The divisor value of 5 in the equation above, may vary based on the league. The divisor value in particular embodiments indicates the maximum difference in runs plus 1 that will earn ScorePoints. For example, the San Francisco Giants are playing a regular season home game against the Chicago Cubs where the Giants currently have 5 runs scored and the Cubs have scored 7 runs. If, for example, the ScoreWeight was set to 50, then the ScorePoints for the Giants-Cubs game may be calculated at 30.

In particular embodiments, NEOG corresponds with the current status of the sporting event, assigning a higher value for a sporting event the longer that it has been ongoing. For example, and not by way of limitation, the following NEOG values may correlate to a baseball game:

| | |
|---|---|
| Game Completed | −35 |
| Pre-game, delayed, or cancelled | 0 |
| 1st-3rd inning | 25 |
| 4th-6th inning | 50 |
| 7th-9th inning | 75 |
| 10th-13th inning | 100 |
| 14th-18th inning | 150 |
| 19th inning or greater | 200 |

In particular embodiments, SeasonStatus indicates current season status of the associated sporting event and is based on when the current sporting event occurs relative to an entire sports season. SeasonStatus may indicate how interesting the sporting event may be, assuming that in a sport that has a post-season, that a post-season sporting event is more interesting than a regular season sporting event. SeasonStatus may further indicate that within the post-season, later post-season rounds are more interesting than earlier post-season rounds, and sporting events where one opponent may be eliminated from further competition are very interesting. A value for Algorithm may be calculated without having a value for SeasonStatus when a value for SeasonStatus is unavailable. In particular embodiment, the following values or equations may be used to derive a value for SeasonStatus:

| | |
|---|---|
| Pre-season | −25 |
| Regular Season | $\left(\frac{(\#CalendarDays)}{(TotalCalendarDays)}\right) * 25$ |
| Post-season | (PlayoffRound * 25) + 25 |
| Post-season Bonus: Elimination | 25 |
| Post-season Bonus: Game 7 or Game 5 | 25 | where #CalendarDays indicates a number of calendar days into the current season that the sporting event occurs, TotalCalendarDays indicates the total number of calendar days of the current season, and PlayoffRound indicates the round of the playoffs in which the sporting event occurs. If an opponent faces elimination from further competition depending on the result of the associated sporting event, a bonus value may be added because the possibility of elimination may make the game more interesting. For example, but not by way of limitation, in a post-season basketball game, if the Golden State Warriors were playing in game 5 of a seven game series against the Los Angeles Clippers, and the Warriors had won one of the previous four games whereas the Clippers had won three of the previous four games, the Warriors would be facing elimination in game 5. In this example, a bonus value may be added because the Warriors would be eliminated if they lose game 5. If the current sporting event is a game 5 of a five game series or game 7 of a seven game series, then a bonus value may also be added because the last game of the series may make the game more interesting. In another example embodiment, if the Clippers and the Warriors were tied in the series at three games each, and they were playing in game 7 of a seven game series, a bonus value for game 7 may be added. A bonus value may also be added if the current sporting event is a game 5 of a give game series. Note that a value for Algorithm may be calculated without having a bonus value for elimination, game 5, or game 7.

In particular embodiments, current network traffic for the sporting event may be calculated by accessing web server logs for a predetermined time period, e.g., the past 7 days, extracting the number of page views for the box score of each sporting event from the web server logs, and then for every minute, calculating and storing two values: (1) an average or mean number of page views for each of one or more sporting events over a running 5 minute period prior to the current minute, and (2) the standard deviation of the page views for each of one or more sporting events over a running 60 minute period prior to the current minute. By way of example, but not limitation, if the current time is 8:26 pm, an average or mean number of page views for each of one or more sporting events would be calculated for 8:22 pm through 8:26:59 pm and a standard deviation of the pages views for each of one or more sporting events would be calculated for 7:27 pm through 8:26:59 pm.

In particular embodiments, current user response may be based on a bucketing system that divides user responses into time segments, or time buckets, such as five minute, or 300 second, time buckets. When a user response arrives from the user, the Current Bucket may be calculated, where Bucket Number=1, using the following formula:

CurrentBucket=CurrentServerTime−
((CurrentServerTime%BucketSize)*
BucketNumber), where CurrentServerTime is the number of seconds since epoch, or Unix time, BucketSize indicates a time bucket, e.g., five minutes, CurrentServerTime%Bucket Size indicates a modulo operation of CurrentServerTime and BucketSize, and BucketNumber specifies the time bucket for which the CurrentBucket will be calculated. Each user response may be stored in one or more of data storages 240 or in the Sporting Event Monitor/Collector 222 of server 220, as illustrated in FIG. 2. Once time has passed beyond the current time bucket, the last completed time bucket may be BucketNumber=2, and the second to last completed time bucket may be BucketNumber=3.

In particular embodiments, the current user response is derived by calculating a value for the total user response and using a table to determine the value for the current user response. The value for the total user response may be calculated by accessing the total stored user responses from the last completed bucket (Bucket 2) as well as the total stored user responses from the second to the last completed bucket (Bucket 3) using the following formula:

TotalUserResponse=(Bucket 2)+(0.5*Bucket 3),

Once the total user response has been calculated, it may be compared to the values in the following table:

| Total User Response | Current User Response |
|---|---|
| 0 | 0 |
| 1-10 | 25 |
| 11-20 | 75 |
| 21+ | 150 |

The value for the current user response may be determined by its correlation to the total user response.

As explained above, various pieces of past sporting event data or predicted future sporting event data may decrease in their influence on the calculated value as the time corresponding to the specific pieces of sporting event data is farther away from the current time. In particular embodiments, a degradation coefficient may affect how the various pieces of past sporting event data or predicted future sporting event data influence the calculated value. The degradation coefficient may cause the influence to decrease linearly or exponentially over time, or be based on a predefined time threshold or a half-life. In particular embodiments, the current user response may decrease in its influence linearly or exponentially on the calculated value as the time corresponding to the current user response is farther away from the current time. For example, if the degradation coefficient was applied to current user response that is two hours old, current user response may have less influence on the calculated value than if the degradation coefficient was applied to current response that is one hour old, of if the degradation coefficient was applied to current response that is thirty minutes old.

In particular embodiments, editorial may be controlled by human editors in order to adjust the calculated value for the sporting event up or down based on importance or popularity of the sporting event. In step 320, a value for a sporting event may still be calculated if there is no value for editorial. If there is an editorial value, it may be any positive or negative number. The editorial value is intended to capture scenarios that may not be taken into account by any other variable when the value for the sporting event is calculated. Example scenarios that may justify a positive editorial value may include, but are not limited to, milestone sporting events, such as the 10,000th game by a team, opportunities for an individual player to break a season or lifetime record, unprecedented winning streaks, or sporting events where league rivals oppose each other.

In particular embodiments, the value that has been calculated for the sporting event in step 320 is compared to a threshold requirement, as illustrated in step 330, to determine if the value satisfies the threshold requirement. The threshold requirement may be a threshold value that is significant enough to eliminate most of the values calculated for the sporting events so that only the most significant or popular sporting events satisfy the threshold requirement. One or more of the sporting events may satisfy the threshold requirement or no sporting events may satisfy the threshold requirement. In particular embodiments, the threshold requirement may be predetermined, e.g., manually by human editors or automatically based on average values of the sporting events.

If the value calculated for the sporting event satisfies the threshold requirement, then the sporting event data for the sporting event may be displayed, as illustrated in step 340. For example, when the calculated value of the sporting event satisfies the threshold requirement, the sporting event data may be displayed in component 110 of FIG. 1. If the value calculated for the sporting event does not satisfy the threshold requirement, then the sporting event data for the sporting event may not be displayed.

The steps illustrated in FIG. 3 are described with respect to a single sporting event. As described above, there may be a wide variety of sporting events occurring at any given time all over the world. In particular embodiments, the steps illustrated in FIG. 3 may be applied to any number of sporting events that have occurred, are occurring, or will occur. Particular embodiments may calculate the values of one or more sporting events belonging to one or more sports. In particular embodiments, the sporting events may all occur within a time period, such as a single day. Particular embodiments contemplate the values of one or more sporting events being sorted or ranked by any desirable sorting or ranking method, such as a sorting or ranking algorithm. In particular embodiments, one or more of the sorted calculated values of each of the one or more sporting events may satisfy the threshold requirement or no sporting events may satisfy the threshold requirement. If one or more calculated values satisfy the threshold requirement, then sporting event data may be displayed in component 110 of FIG. 1. In addition, particular embodiments may rank a set of sporting events based on their respective calculated values. The set of sporting events may include sporting events belonging to a single sport or sporting events belonging to different sports. Thus, particular embodiments may rank sporting events within a single sport or across multiple sports.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
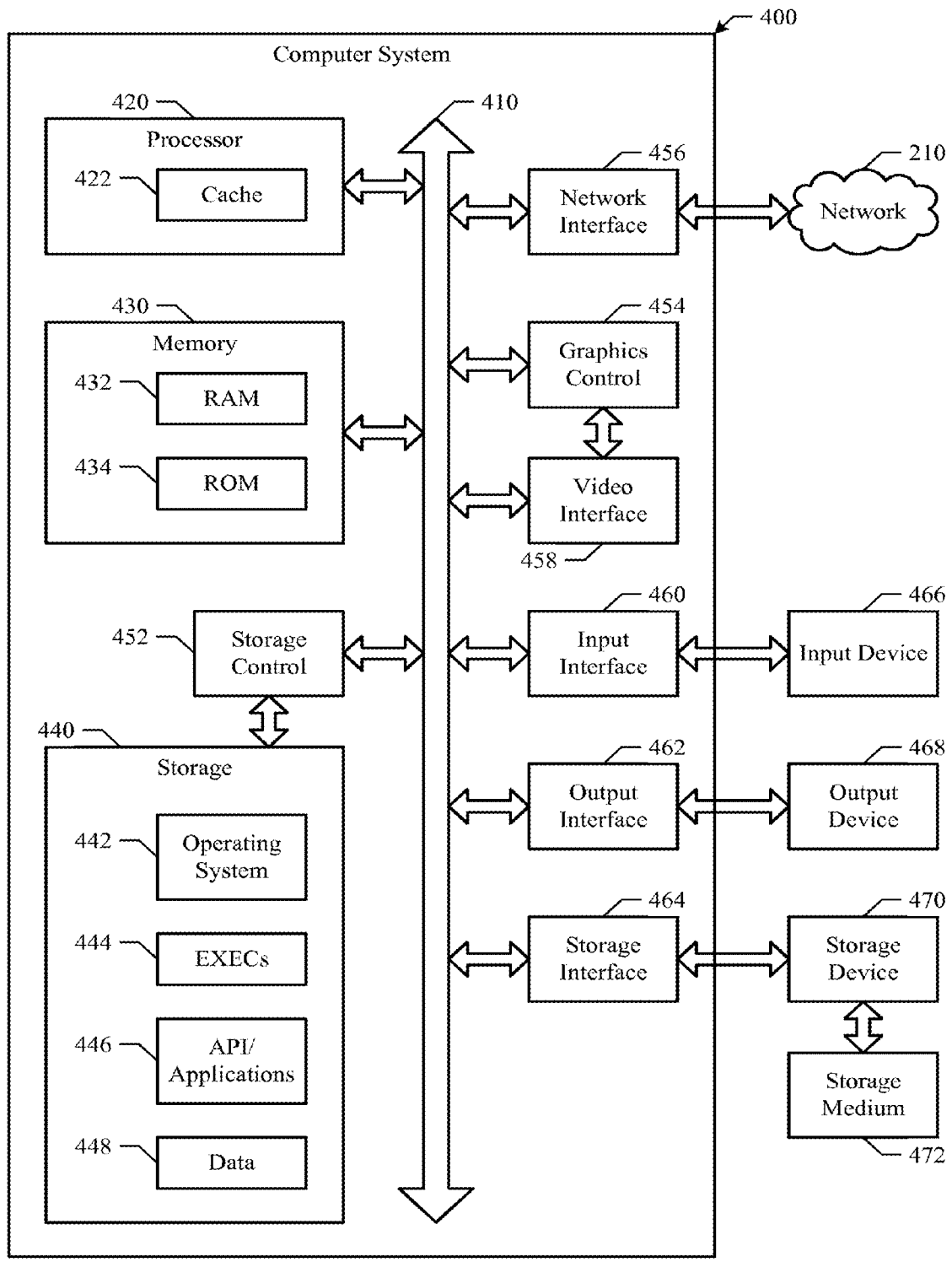
FIG. 4 illustrates an example computer system.

For example, FIG. 4 illustrates an example computer system 400 suitable for implementing one or more portions of particular embodiments. Although the present disclosure describes an illustrates a particular computer system 400 having particular components in a particular configuration, the present disclosure contemplates any suitable computer system having any suitable components in any suitable configuration. Moreover, computer system 400 may take any suitable physical form, such as for example one or more integrated circuits (ICs), one or more printed circuit boards (PCBs), one or more small handheld devices (such as mobile telephones or PDAs), on or more personal computers, or one or more super computers.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing). Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 420 (or central processing units (CPUs)). A processor 420 may contain a cache 422 for temporary local storage of instructions, data, or computer addresses. Processors 420 are coupled to one or more storage devices, including memory 430. Memory 430 may include random access memory (RAM) 432 and read-only memory (ROM) 434. Data and instructions may transfer bidirectionally between processors 420 and RAM 432. Data and instructions may transfer unidirectionally to processors 420 from ROM 434. RAM 432 and ROM 434 may include any suitable computer-readable storage media.

Computer system 400 includes fixed storage 440 coupled bidirectionally to processors 420. Fixed storage 440 may be coupled to processors 420 via storage control unit 452. Fixed storage 440 may provide additional data storage capacity and may include any suitable computer-readable storage media. Fixed storage 440 may store an operating system (OS) 442, one or more executables 444, one or more applications or programs 444, data 448, and the like. Fixed storage 440 is typically a secondary storage medium (such as a hard disk) that is slower than primary storage. In appropriate cases, the information stored by fixed storage 440 may be incorporated as virtual memory into memory 430.

Processors 420 may be coupled to a variety of interfaces, such as, for example, graphics control 454, video interface 458, input interface 460, output interface 462, and storage interface 464, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 456 may couple processors 420 to another computer system or to network 210. With network interface 456, processors 420 may receive or send information from or to network 210 in the course of performing steps of particular embodiments. Particular embodiments may execute solely on processors 420. Particular embodiments may execute on processors 420 and on one or more remote processors operating together.

In a network environment, where computer system 400 is connected to network 210, computer system 400 may communicate with other devices connected to network 210. Computer system 400 may communicate with network 210 via network interface 456. For example, computer system 400 may receive information (such as a request or a response from another device) from network 210 in the form of one or more incoming packets at network interface 456 and memory 430 may store the incoming packets for subsequent processing. Computer system 400 may send information (such as a request or a response to another device) to network 210 in the form of one or more outgoing packets from network interface 456, which memory 430 may store prior to being sent. Processors 420 may access an incoming or outgoing packet in memory 430 to process it, according to particular needs.

Computer system 400 may have one or more input devices 466 (which may include a keypad, keyboard, mouse, stylus, etc.), one or more output devices 468 (which may include one or more displays, one or more speakers, one or more printers, etc.), one or more storage devices 470, and one or more storage medium 472. An input device 466 may be external or internal to computer system 400. An output device 468 may be external or internal to computer system 400. A storage device 470 may be external or internal to computer system 400. A storage medium 472 may be external or internal to computer system 400.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 430 may include one or more computer-readable storage media embodying software and computer system 400 may provide particular functionality described or illustrated herein as a result of processors 420 executing the software. Memory 430 may store and processors 420 may execute the software. Memory 430 may read the software from the computer-readable storage media in mass storage device 430 embodying the software or from one or more other sources via network interface 456. When executing the software, processors 420 may perform one or more steps of one or more processes described or illustrated herein, which may include defining one or more data structures for storage in memory 430 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
   determining, by a sporting event value calculating computer, current network traffic to a plurality of websites relating to a sporting event that is one of a plurality of sporting events, the current network traffic to the plurality of websites based on accessing server logs to perform a comparison between the number of webpage views for the plurality of websites at a first time to a predetermined number of standard deviations above a mean of network traffic received from the plurality of websites at a past second time;
   determining, by the sporting event value calculating computer, current user responses to the sporting event, the current user responses indicating a number of times that users have indicated importance or popularity of the sporting event;
   receiving, by the sporting event value calculating computer, one or more opinions of the sporting event;
   storing, by the sporting event value calculating computer, the current user responses to the sporting event, the current network traffic for the plurality of websites relating to the sporting event, and the one or more opinions of the sporting event in a first set of sporting event data;
   calculating, by the sporting event value calculating computer, a value of the sporting event by applying the first set of sporting event data associated with the sporting event to one or more sport-specific algorithms, each sport-specific algorithm having been specifically determined for a particular sport to which the sporting event is categorized;
   comparing, by the sporting event value calculating computer, the value to a threshold requirement; and
   when the value satisfies the threshold requirement, communicating, by the sporting event value calculating computer, the first set of sporting event data associated with the sporting event to a client device for display.

2. The method of claim 1, wherein, when the sporting event is baseball, the sport-specific algorithm further comprises an algorithm dependent on Matchup, ScorePoints, NEOG, and SeasonStatus.

3. The method of claim 2, wherein Matchup corresponds to a quality of opposing teams playing in a baseball game.

4. The method of claim 3, wherein ScorePoints correspond to a current event status of the baseball game.

5. The method of claim 4, wherein NEOG corresponds to Near End of Game and corresponds to the current event status of the baseball game.

6. The method of claim 5, wherein SeasonStatus corresponds to a current season status of the baseball game.

7. The method of claim 1, wherein the current user responses are determined by total user responses.

8. The method of claim 7, wherein each current user response decreases in influence as a time corresponding to the each current user response is farther away from a current time.

9. The method of claim 1, wherein the calculating of the value of the sporting event further comprises adjusting the calculated value up or down based on the one or more opinions.

10. The method of claim 9, wherein the one or more opinions are positive when the sporting event is a milestone sporting event.

11. The method of claim 9, wherein the one or more opinions are positive when there is an opportunity for an individual player to break a season or lifetime record.

12. The method of claim 9, wherein the one or more opinions are positive when league rivals oppose each other.

13. A non-transitory computer readable storage medium storing computer program instructions capable of being executed by a computer processor on a sporting event value calculating computer, the computer program instructions defining the steps of:
- determining, by the sporting event value calculating computer, current network traffic to a plurality of websites relating to a sporting event that is one of a plurality of sporting events, the current network traffic to the plurality of websites based on accessing server logs to perform a comparison between the number of webpage views for the plurality of websites at a first time to a predetermined number of standard deviations above a mean of network traffic received from the plurality of websites at a past second time;
- determining, by the sporting event value calculating computer, current user responses to the sporting event, the current user responses indicating a number of times that users have indicated importance or popularity of the sporting event;
- receiving, by the sporting event value calculating computer, one or more opinions of the sporting event;
- storing, by the sporting event value calculating computer, the current user responses to the sporting event, the current network traffic for the plurality of websites relating to the sporting event, and the one or more opinions of the sporting event in a first set of sporting event data;
- calculating, by the sporting event value calculating computer, a value of the sporting event by applying the first set of sporting event data associated with the sporting event to one or more sport-specific algorithms, each sport-specific algorithm having been specifically determined for a particular sport to which the sporting event is categorized;
- comparing, by the sporting event value calculating computer, the value to a threshold requirement; and
- when the value satisfies the threshold requirement, communicating, by the sporting event value calculating computer, the first set of sporting event data associated with the sporting event to a client device for display.

14. The medium of claim 13, wherein the current user responses are determined by total user responses.

15. The medium of claim 14, wherein each current user response decreases in influence as a time corresponding to the each current user response is farther away from a current time.

16. The medium of claim 13, wherein the calculating of the value of the sporting event further comprises adjusting the calculated value up or down based on the one or more opinions.

17. The medium of claim 16, wherein the one or more opinions are positive when the sporting event is a milestone sporting event.

18. The medium of claim 16, wherein the one or more opinions are positive when there is an opportunity for an individual player to break a season or lifetime record.

19. The medium of claim 16, wherein the one or more opinions are positive when league rivals oppose each other.

20. A sporting event value calculating computer comprising:
- a processor;
- a storage medium for tangibly storing thereon program logic for execution by the processor, the program logic comprising:
    - current network traffic determining logic executed by the processor for determining current network traffic to a plurality of web sites relating to a sporting event that is one of a plurality of sporting events, the current network traffic to the plurality of websites based on accessing server logs to perform a comparison between the number of webpage views for the plurality of websites at a first time to a predetermined number of standard deviations above a mean of network traffic received from the plurality of websites at a past second time;
    - current user response determining logic executed by the processor for determining current user responses to the sporting event, the current user responses indicating a number of times that users have indicated importance or popularity of the sporting event;
    - receiving logic executed by the processor for receiving one or more opinions of the sporting event;
    - storing logic executed by the processor for storing the current user responses to the sporting event, the current network traffic for the plurality of websites relating to the sporting event, and the one or more opinions of the sporting event in a first set of sporting event data;
    - calculating logic executed by the processor for calculating a value of the sporting event by applying the first set of sporting event data associated with the sporting event to one or more sport-specific algorithms, each sport-specific algorithm having been specifically determined for a particular sport to which the sporting event is categorized;
    - comparing logic executed by the processor for comparing the value to a threshold requirement; and
    - communicating logic executed by the processor for, when the value satisfies the threshold requirement, communicating the first set of sporting event data associated with the sporting event to a client device for display.

* * * * *